Aug. 21, 1923.
E. ALBER
ELECTRIC LAMP
Filed Dec. 10, 1919
1,465,293
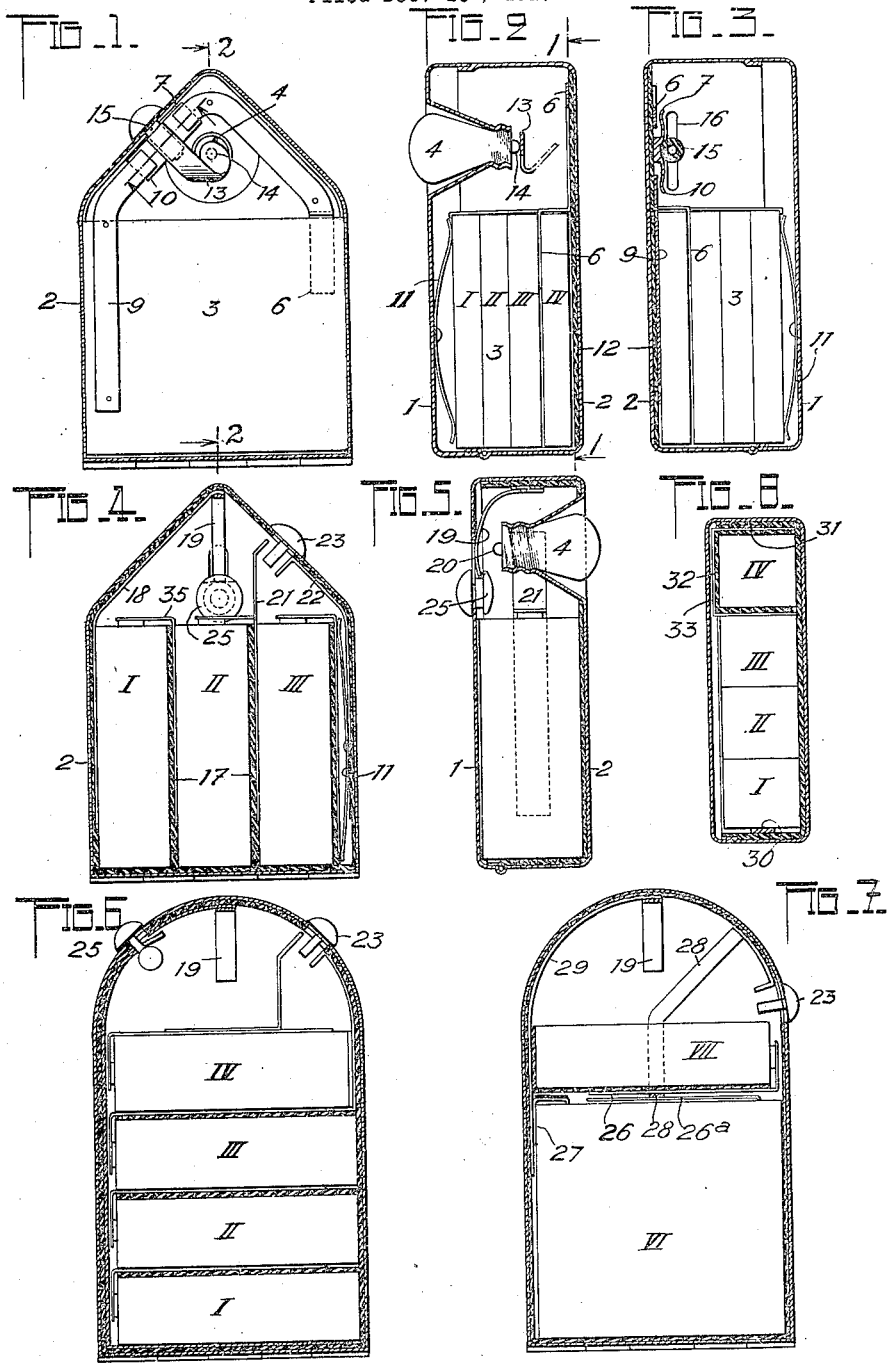
Inventor.
Eugen Alber
By Lawrence Langner
Attorney.

Patented Aug. 21, 1923.

1,465,293

UNITED STATES PATENT OFFICE.

EUGEN ALBER, OF BASEL, SWITZERLAND.

ELECTRIC LAMP.

Application filed December 10, 1919. Serial No. 343,870.

*To all whom it may concern:*

Be it known that I, EUGEN ALBER, a citizen of the Swiss Republic, and resident of Basel, Switzerland, chemist, have invented new and useful Improvements in Electric Lamps, of which the following is a full, clear, and exact specification.

The present invention relates to an electric lamp and particularly to a pocket electric battery lamp of the kind having different degrees of brightness in which a battery for the supply of current is combined with an incandescent glow lamp designed substantially for the normal service voltage of the battery. The essential feature of the improved lamp consists in the battery adapted for normal service conditions (normal or main battery) being composed of a plurality of individually exchangeable cells electrically connected together in series only by simple superimposition and contacting without wires, strips, screws, soldering and the like and having combined with it one or more additional elements of the same contacting type as those of the said main battery together with convenient strip contact switch means so arranged that by the switching-in of said additional element or elements the voltage impressed on the lamp can be raised beyond the normal value in order to cause the lamp to be "overrun" and consequently to have a high light intensity. In known electric lamps adapted for different degrees of brightness, these degrees are in all cases obtained only by switching off one or more cells of a battery for the normal service voltage of which the glow lamp is constructed, but it is hitherto unknown, so far as I am aware, in electric pocket lamps and the like, to increase the supply voltage above the normal battery tension by switching-in special or additional cells in such a manner that the glow lamp may temporarily burn with considerable "overrunning" and also to raise the voltage of the battery (for which the glow lamp is constructed) if the battery should have deteriorated by switching-in one or more additional cells so that the partially exhausted main battery may still be utilized for supplying useful current, whereas otherwise such an exhausted battery must be thrown away.

The improved arrangement may comprise a battery subdivided into elements of suitable voltage having the points of connection of the battery sections connected to an incandescent or glow lamp body by means of suitable strip conductors and the necessary switch contact devices. With this arrangement it is possible to cause the lamp to burn temporarily at an abnormally high voltage or, when the whole battery or some elements thereof are becoming exhausted, to utilize the still inherent capacity of the battery by the addition of one or more additional elements with a greater efficiency than would otherwise be possible.

If for example a lamp with a three element battery is arranged to supply current to an incandescent lamp designed for the voltage of three elements, when the battery is becoming exhausted, the voltage thereof can be increased by switching in an additional or fourth element, so that the three first elements can be utilized for further current supply, the resulting effect being a considerable increase in the efficiency of the battery. The same conditions exist with a lamp having a lamp bulb designed for operation on two battery elements, if a third element is switched in. In the latter case, the incandescent lamp can also be designed for a normal running voltage which lies between the double and triple element voltage.

The improved arrangement is particularly advantageous in connection with primary batteries, formed, for example, of dry cell elements which are easily replaceable. These cell elements may be constructed in the form of plates of the dry element type which by simple superimposition with their terminals of opposite polarity in contact with one another give the desired total voltage. The battery may also be composed partly of accumulator cells and partly of galvanic or dry elements, or the usual block batteries formed of two or more elements rigidly cemented together in one container may be combined with the above mentioned individual elements.

The improved lamp is particularly used as pocket lamp, but it is also applicable to any other use, for example as table lamp, hand lamp, etc.

The accompanying drawing represents several embodiments of the subject of invention in the form of electric pocket lamps;

Fig. 1 is a vertical section of one of these constructions, along line 1—1 of Fig. 2;

Fig. 2 is a vertical section thereof, along line 2—2 of Fig. 1;

Fig. 3 is another vertical section thereof, showing more clearly the switching devices;

Figs. 4 and 5 illustrate by two sections perpendicular to each other a construction completed by a safety circuit breaker in the lamp-circuit;

Fig. 6 shows the same safety device in a pocket lamp having a different battery composition;

Fig. 7 gives a further form of pocket lamp with the use of a block battery and an additional battery element.

Fig. 8 shows a modification of pocket lamp according to the invention.

Referring to Figures 1, 2 and 3, the metallic lamp case formed of two parts 1, 2 contains the current supply battery 3, the glow lamp body 4 and contact devices hereinafter described. The upper case part 1 forming a cover hinged at 8 to the lower part or case body 2 carries the glow lamp body 4 screwed into a metallic reflector connected to the cover part so as to have its one pole in metallic contact with the case part 1, and a curved leaf spring 11 fixed on the inner side thereof, leaf spring 11, when the cover part 1 is closed, being forced against the first battery element. The battery consists here of four separate adjacent or superimposed elements I, II, III, IV having the form of plates and being in electric connection with one another by their contrary poles at their side faces, under the action of the tensioned leaf spring 11, the construction of such plate elements being well known. The elements I, II, III constitute the main or normally operating parts of the battery, while the element IV constitutes an additional one for tension strengthening purposes. Whilst the upper element I is in electric contact with the case part 1, the lower element IV lies against an insulating plate 12 forming the base part of the case body. This plate 12 carries two metallic contact strips 6, 9 extending into the upper part of the case, the contact strip 9 forming a terminal pole to take off the current from the lower element IV, the contact strip 6 being recurved and inserted between the elements III and IV so as to form a terminal pole for taking off the current from the third element. The free end of the contact strip 6 extends below a contact leaf spring 7 and the free end of the contact strip 9 is situated below a contact leaf spring 10 (Fig. 3). Both these leaf springs 7, 10 are integral with the recurved elastic contact tap 13, being formed of one piece of sheet metal, said elastic contact tap 13 being in electric contact with the centre pole 14 of the glow lamp body 4. The leaf springs 7, 10 are normally out of contact with the contact strips 6, 9, owing to their own elasticity. They are controlled by a switching slide 15 guided in a slot 16 provided in the lamp case. This slide consists of a headed pin provided with an insulating bush engaging over the leaf springs 7, 10. When the slide 15 is pushed to the one side from its middle inoperative position, it presses the leaf spring 7 down upon the contact strip 6 so as to close the circuit through the three main elements I, II, III of the battery, the current flowing therefrom through the strip 6, the leaf spring 7, the contact top 13, the glow lamp body 4, the case cover 1, the pressure spring 11 back to the battery, so that the lamp burns with the usual battery tension of three elements. When the contact slide 15 is pushed to the opposite side, the current is switched on over the contact strip 9, being thus supplied from all the four elements of the battery to produce a brighter lighting of the lamp owing to the increased operative tension.

Instead of the sliding contact switch 15, there may also be employed a pusher or rotary switch or the like. The switch may also be mounted at another convenient place of the lamp case. Moreover, the case of the lamp and the elements may have any convenient form, such as rectangular, circular, annular and so on, and the glow lamp body, mounted here in the cover may also be arranged within the other or body part of the case. The number of the battery elements may vary and it is also possible to employ a glow lamp body of different strength relatively to the main battery tension and also to place the glow lamp body at the top of the case.

Further, the lamp can be provided with various accessory devices, such as safety breakers, and the relative arrangement of the battery elements may vary within large limits.

Figures 4 and 5 show a constructional form of an electric pocket lamp wherein the battery consists of three cylindrical or prismatic ordinary, for example zinc-carbon elements I, II, III placed side by side with the interposition of an insulation sheet 17, the centre pole (carbon) of one of them being electrically connected to the outer pole (zinc) of the following one by means of a recurved conducting strip 35. One terminal pole of the battery is connected to a contact strip 18 placed upon insulation within the lamp case and connected to a leaf spring 19 arranged opposite the centre pole 20 of the glow lamp body, which is here screwed into the body 2 of the case, whilst the other terminal pole of the battery is formed either by the contact strip 21 or by the contact strip 22 which latter is connected to the leaf spring 11, according to whether two battery elements only or all of them are switched on by the switch slide 23, the circuit being closed in both cases over the metallic case parts at the points of the switch slide 23 and of the screwing of the glow lamp body with its outer pole into the metallic case body 2. The leaf spring 19 serves for safety purposes. A control slide cam 25 cooperating therewith is arranged on the cover 1 of the case. Normally, the lamp circuit is interrupted by the leaf spring 19 and remains interrupted even if unfortunately in the pocket the operating switch 23 should be displaced. For closing the lamp circuit at the leaf spring 19, the cover 1 is opened and the control cam 25 so adjusted that in closed position of the cover it allows the leaf spring 19 to be forced inwards into contact with the centre pole 20 of the glow lamp body, so that when operating the switch 23, the lamp circuit is completed through the battery. Obviously, the safety breaker 19, 25 may have any other convenient construction and be arranged at any convenient place of the case, outside or inside thereof.

Fig. 6 shows a construction of lamp wherein the battery elements I, II, III, IV are superimposed as being in horizontal position, the upper one being that which can be switched on or off by the operation of the switch 23. A safety breaker is indicated at 25.

In the form of Fig. 7, the main battery is formed of a so-called block battery VI which normally furnishes the current and of an additional zinc-carbon element VII arranged over said block battery so as to have one of its poles 26 in contact with the pole 26ª of the block-battery, whilst the other pole (zinc) of the element VII forms directly one contact pole for the switch 23, the other contact pole of which is electrically connected by a conductor 28 to the pole 26ª of the block battery, which at its pole 27 is in electric contact with the lamp supplying conductor 29. In both these constructions, the lamp case has a lower or main part of prismatic form with the electric battery or elements therein and an upper or top part of substantially semi-circular form wherein the glow lamp body as well as the contact and switch devices are arranged.

Fig. 8 shows by a transverse section an electric pocket lamp with four prismatic battery elements I, II, III, IV arranged to be used for the increased lighting tension of the lamp when they are connected with one another between the current conductors 30, 31, whilst for a lower tension one of the battery elements is cut off by means of a U-like switching bridge piece 32 of insulating material provided with a short-circuiting strip 33, said bridge piece being inserted over the fourth battery element so as to electrically connect, by its strip 33, the third battery element with the corresponding current conductor 31.

The foregoing examples mainly differ from each other by the arrangement of the elements of their battery. A somewhat different form of the invention is that wherein the battery elements are enclosed within a special box of insulating material removably inserted into the lamp case of any convenient form, the said box being provided with the hand operatable circuit switch and having substantially the shape of an ordinary block battery, so that it can be inserted into pocket lamp cases of the usual kind.

Obviously, the term "element" or "battery element" or dry element used in the foregoing description and hereinafter in the claim shall be considered as comprising any known or other construction of electric cells of any nature (so called dry or wet) and of any composition. Furthermore, the switching operation herein referred to is to be understood in such a manner that one or more battery elements are added to the respective source of current or again cut off therefrom.

What I claim is:

In a pocket electric battery lamp, a pocket case having a lower part of substantially rectangular cross section and a top part of substantially semi-circular form, a block battery constituting a normally used current supplying main battery, located within said lower case part, an electric glow lamp body placed in said top part of the case and arranged to be normally supplied with current from the block battery at the voltage for which the glow lamp is constructed, an additional current supplying element combined with said block battery and switching means to connect said additional element in series with the block battery and the glow lamp body, so as to cause the lamp to be temporarily over-run, substantially as described.

In witness whereof I have hereunto signed my name this 14th day of November, 1919, in the presence of two subscribing witnesses.

Dr. EUGEN ALBER.

Witnesses:
 WILLIAM E. HOLLAND,
 AMAND BRAUN.